US006598855B1

(12) United States Patent
Petrone et al.

(10) Patent No.: US 6,598,855 B1
(45) Date of Patent: Jul. 29, 2003

(54) MOTORCYCLE AND SMALL VEHICLE LIFT

(75) Inventors: Peter A Petrone, Wellington, FL (US); Lawrence E. Meyer, Wellington, FL (US)

(73) Assignee: Ultimate Lift, Inc., Wellington, FL (US)

( * ) Notice: Subject to any disclaimer, the term of this patent is extended or adjusted under 35 U.S.C. 154(b) by 0 days.

(21) Appl. No.: 10/187,376

(22) Filed: Jul. 1, 2002

(51) Int. Cl.[7] .................................................. B60P 1/48

(52) U.S. Cl. .................. 254/10 R; 254/8 R; 254/93 H; 414/743; 269/904

(58) Field of Search ............................ 254/10 R, 10 B, 254/10 C, 9 R, 9 B, 9 C, 8 R, 8 B, 8 C, 124, 133, 88, 91; 187/8.47, 8.75, 8.71

(56) References Cited

U.S. PATENT DOCUMENTS

| | | | | | |
|---|---|---|---|---|---|
| 2,603,454 | A | * | 7/1952 | Newton | 254/10 |
| 2,785,807 | A | * | 3/1957 | Prowinsky | 214/1 |
| 2,929,519 | A | * | 3/1960 | Taylor | 214/1 |
| 3,863,890 | A | | 2/1975 | Ruffing | |
| 4,088,303 | A | * | 5/1978 | Aquila | 254/88 |
| 4,324,384 | A | | 4/1982 | Elser | |
| 4,348,010 | A | | 9/1982 | Baxter | |
| 4,460,158 | A | | 7/1984 | Chiesa et al. | |
| 4,681,299 | A | | 7/1987 | Siebert | |
| 4,723,756 | A | | 2/1988 | Stumpf, Jr. | |
| 4,899,985 | A | | 2/1990 | Good | |
| 5,193,784 | A | | 3/1993 | Obernberger | |
| 5,211,265 | A | * | 5/1993 | Gregg | 187/8.75 |
| 5,211,376 | A | | 5/1993 | Anderson | |
| 5,271,603 | A | | 12/1993 | White | |
| 5,358,265 | A | | 10/1994 | Yaple | |
| 5,518,224 | A | | 5/1996 | Anderson | |
| 5,690,314 | A | | 11/1997 | Williams | |
| 6,010,299 | A | * | 1/2000 | Jesswein | 414/743 |
| 6,092,787 | A | | 7/2000 | Nayman | |

* cited by examiner

*Primary Examiner*—Joseph J. Hail, III
*Assistant Examiner*—Daniel Shanley
(74) *Attorney, Agent, or Firm*—MacMillan, Sobanski & Todd, LLC

(57) ABSTRACT

A lift apparatus includes a base frame having a pair of ground engaging caster assemblies and an upwardly extending center post, and a pair of folding legs each having an inner end pivotally connected to the base frame and an outer end with a roller attached thereto, the casters and the rollers permitting the lift apparatus to roll across the ground surface. A parallelogram linkage includes a portion of the center post and is attached to vehicle support arms. An actuator is connected between the linkage and the base frame. A pumping handle and a power unit are connected to the actuator for selectively activating the actuator to selectively raise and lower the vehicle support arms between a lowered position for engaging and disengaging from a vehicle and a fully raised position a predetermined distance above the ground on which the base frame rests. The legs and the support arms can be moved to a compact storage position when not in use.

20 Claims, 6 Drawing Sheets

MOTORCYCLE AND SMALL VEHICLE LIFT

BACKGROUND OF THE INVENTION

The present invention relates generally to an apparatus for lifting small vehicles such as motorcycles for maintenance and storage purposes.

There are many different prior art lifts designed for use with small vehicles such as motorcycles, motorbikes, snowmobiles, garden tractors, and the like. Typically, these lifts use a jack to raise a platform or arms supporting either the vehicle ground engaging portion (tires, treads, etc.) or the vehicle frame.

The U.S. Pat. No. 4,088,303 shows a boom pivoted at one end on the upper end of a post and a hydraulic cylinder for raising and lowering the boom. A platform is attached to an opposite end of the boom for supporting a vehicle.

The U.S. Pat. No. 4,460,158 shows a lift for mopeds and motorcycles having a base, a jack for raising and lowering a frame hinged to the base and a support attached to the frame for clamping the footboard of a Vespa brand moped.

The U.S. Pat. No. 4,723,756 shows a lift with four vertically telescoping legs that can be pinned in place when a jack has raised the lift to the desired height.

The U.S. Pat. No. 4,899,985 shows a low-profile hydraulic lift with a pivoted lift arm having detachable lift heads which include hooks, support yokes, chains and support harnesses.

The U.S. Pat. No. 5,211,265 shows a scissors-type snowmobile lift with rails to contact the snowmobile bellypan.

The U.S. Pat. No. 5,271,603 shows a lifting platform connected to a base by four parallel links actuated by a hydraulic jack.

U.S. Pat. No. 6,092,787 shows a manually operated motorcycle lift with a front wheel clamp and a removable extension under the unsupported rear wheel.

SUMMARY OF THE INVENTION

The present invention concerns an apparatus for lifting a small vehicle, such as a motorcycle, for various purposes such as cleaning, maintenance, repositioning from one location to another and storage. The lift apparatus includes: a base frame having a pair of ground engaging caster means and an upwardly extending center post; a pair of folding legs each having an inner end pivotally connected to the base frame and an outer end with a roller attached thereto, the casters and the rollers permitting the lift apparatus to roll across the ground surface; a parallelogram linkage having a pair of upper long links, a pair of lower long links extending generally parallel to the upper long links, an outer short link, and an inner short link formed by a portion of the center post, the upper long links being connected by first and second pivot means to the inner and outer short links respectively, the lower long links being connected by third and fourth pivot means to the inner and outer short links respectively; a vehicle support means attached to the outer short link of the parallelogram linkage; an actuator means having a lower end pivotally connected to the base frame and an upper end connected to the upper long links by a fifth pivot means whereby extension of the actuator means raises the vehicle support means between a lowered position for engaging and disengaging from a vehicle and a fully raised position a predetermined distance above the ground on which the base frame rests, the fourth pivot means being selectively operative to detach the outer short link from the lower long links and permit rotation of the vehicle support means to a storage position; and at least one of a pumping handle and a power unit connected to the actuator means for selectively activating the actuator means to raise the vehicle support means.

The actuator means can be a hydraulic cylinder and the power unit can include an electric motor driving a hydraulic pump providing pressured hydraulic fluid to the cylinder. The lift apparatus includes fastener means for selectively retaining the legs in the lowered position and in the raised position. The vehicle support means includes a pair of spaced apart support arms and vehicle attachment means connected to the support arms for holding a vehicle on the support arms, the vehicle attachment means including at least one bracket slidingly mounted on each of the support arms, each of the brackets having a vehicle engaging hook connected thereto.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
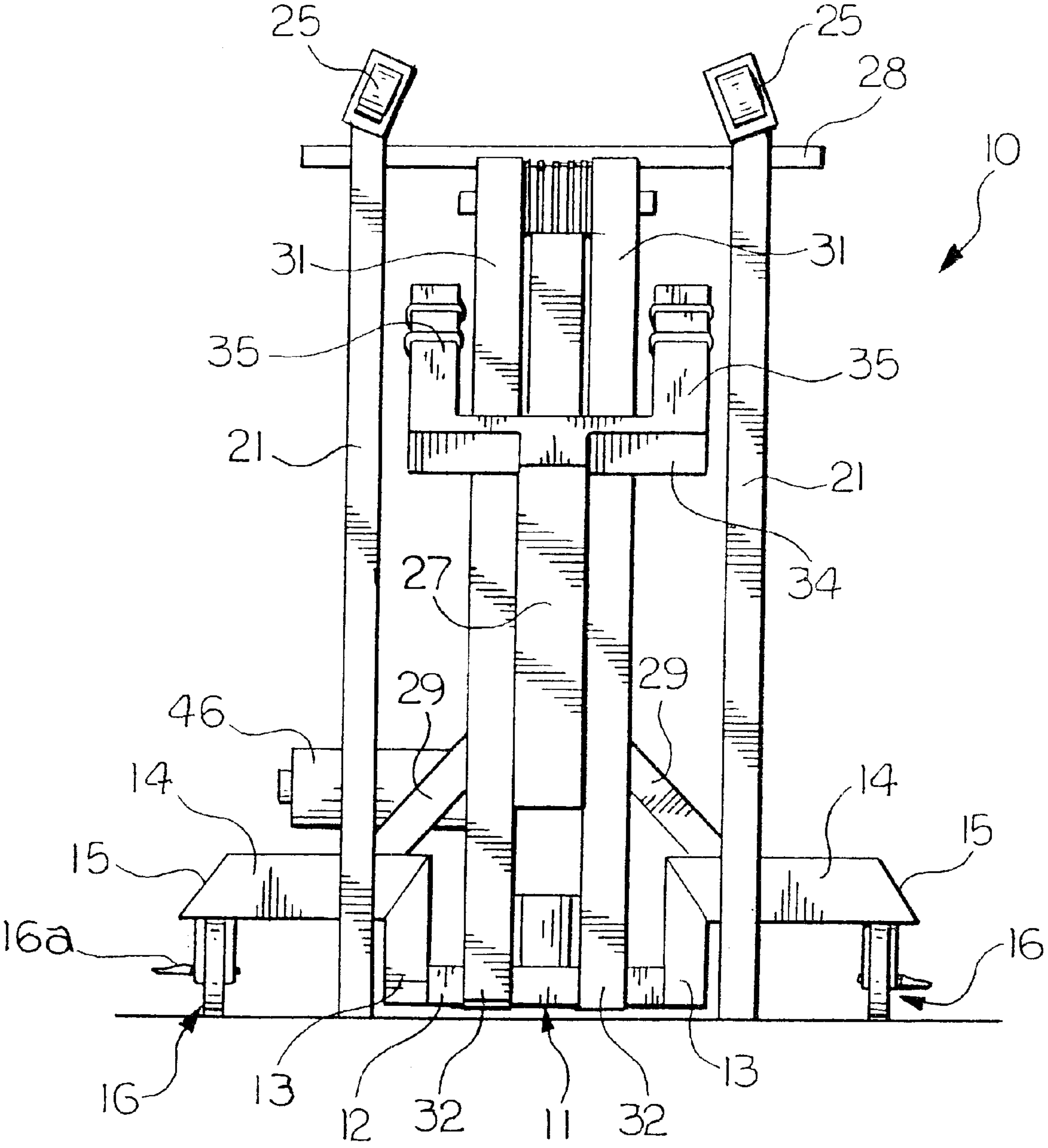
FIG. 1 is a front elevation view of a lift apparatus in accordance with the present invention in a storage position.
Figure 2:
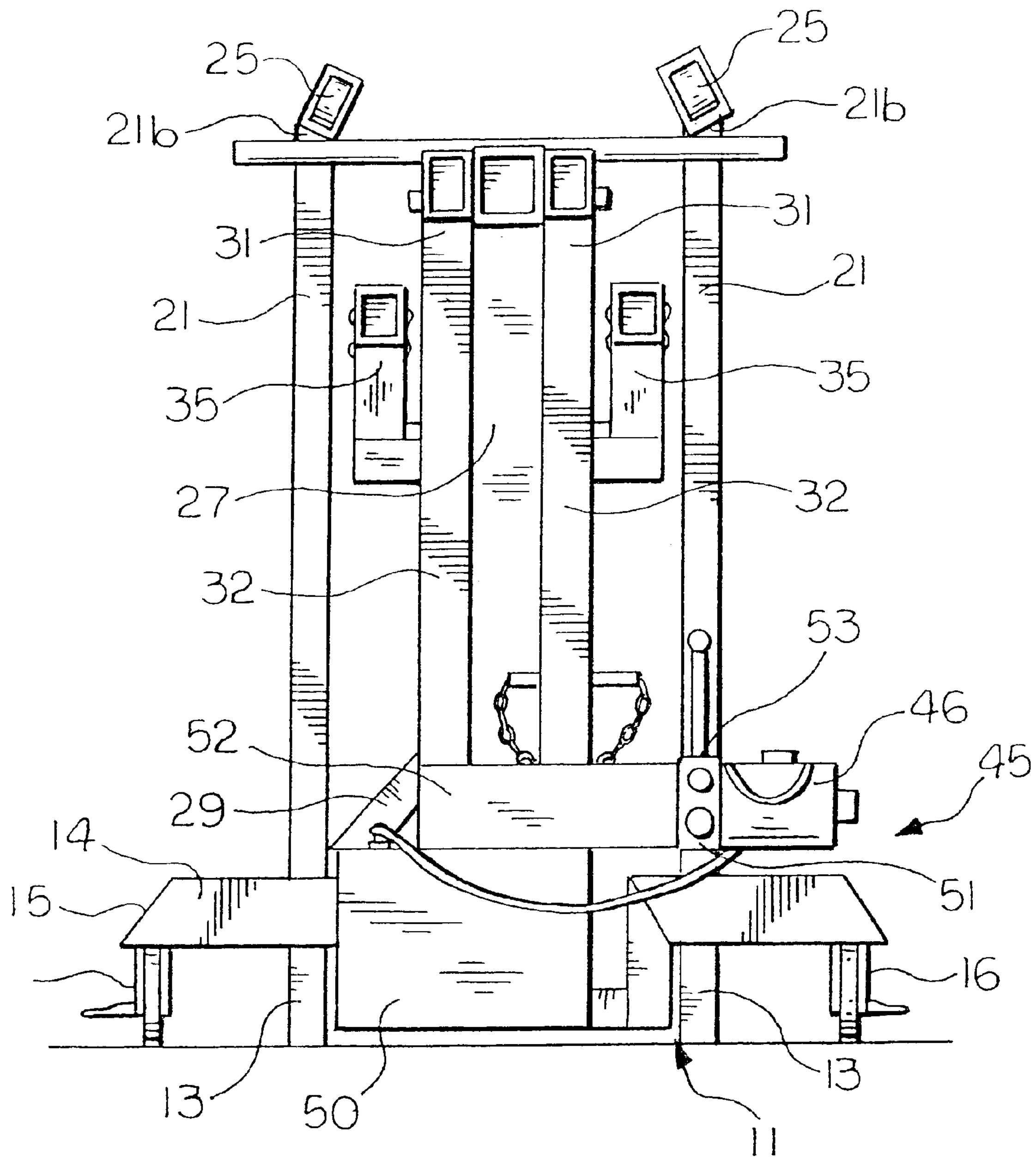
FIG. 2 is rear elevation view of the lift apparatus shown in FIG. 1.
Figure 3:
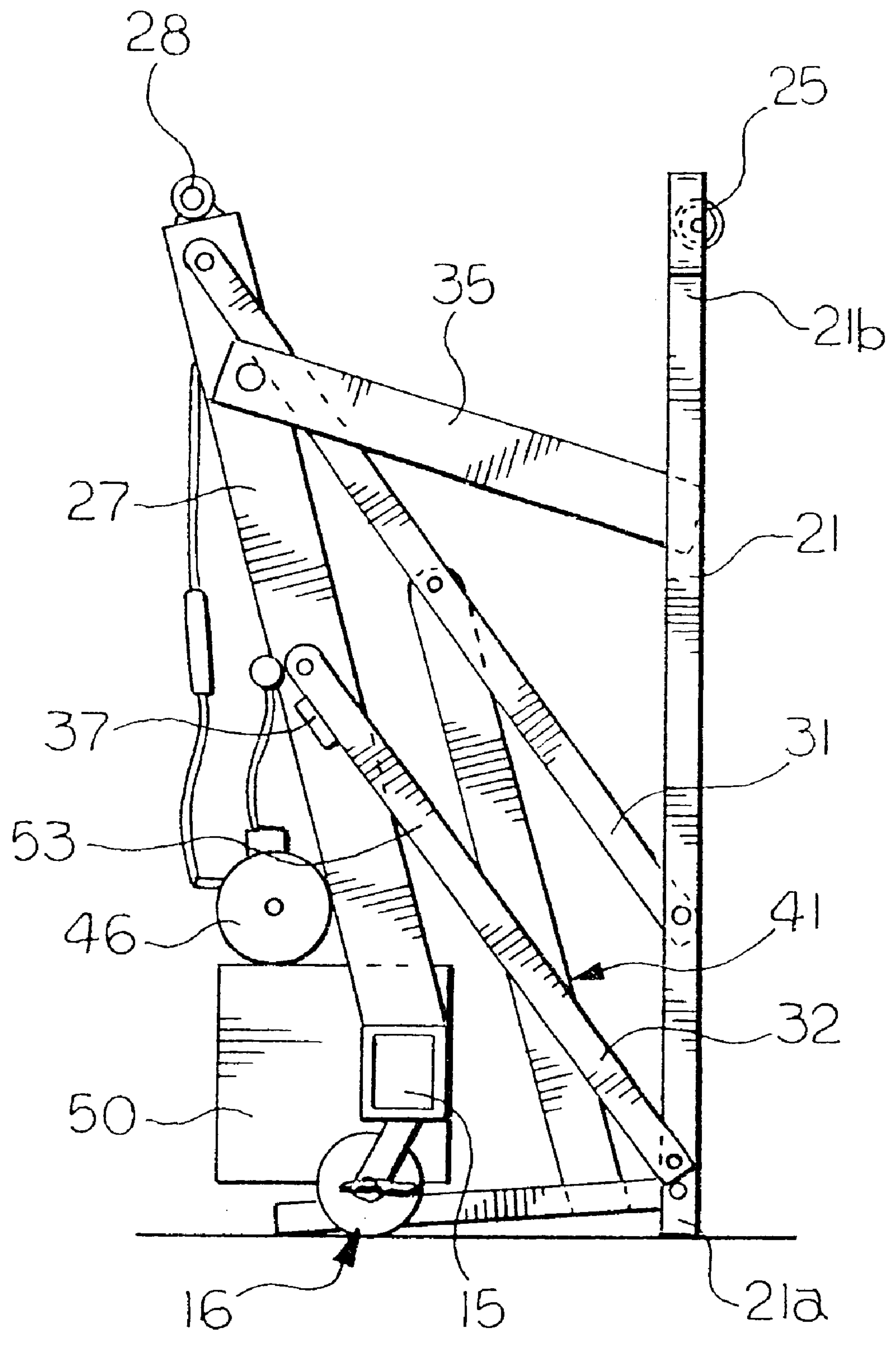
FIG. 3 is a left side elevation view of the lift apparatus shown in FIG. 1.
Figure 4:
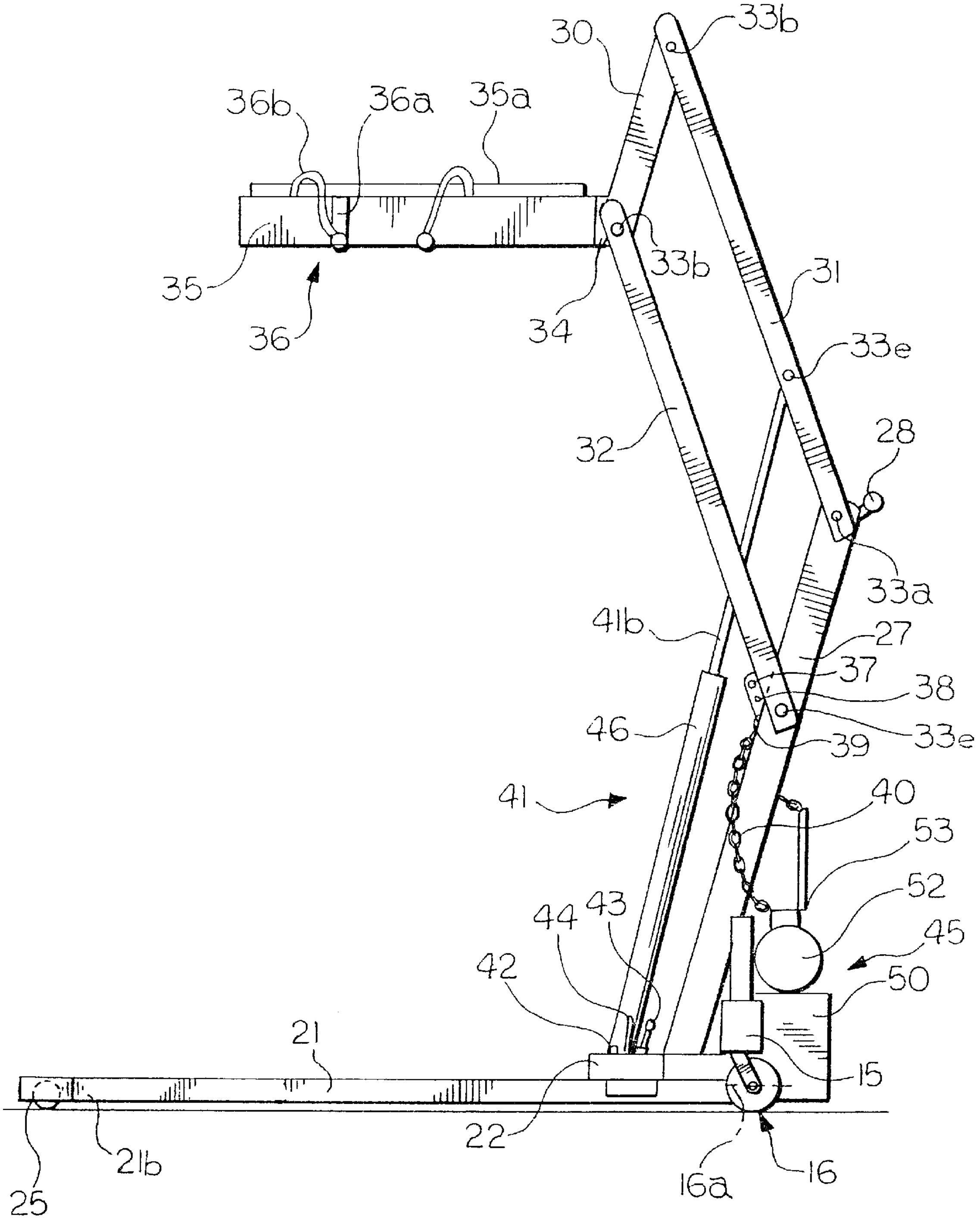
FIG. 4 is a right side elevation view of the lift apparatus shown in FIG. 1 in an operating position.
Figure 5:
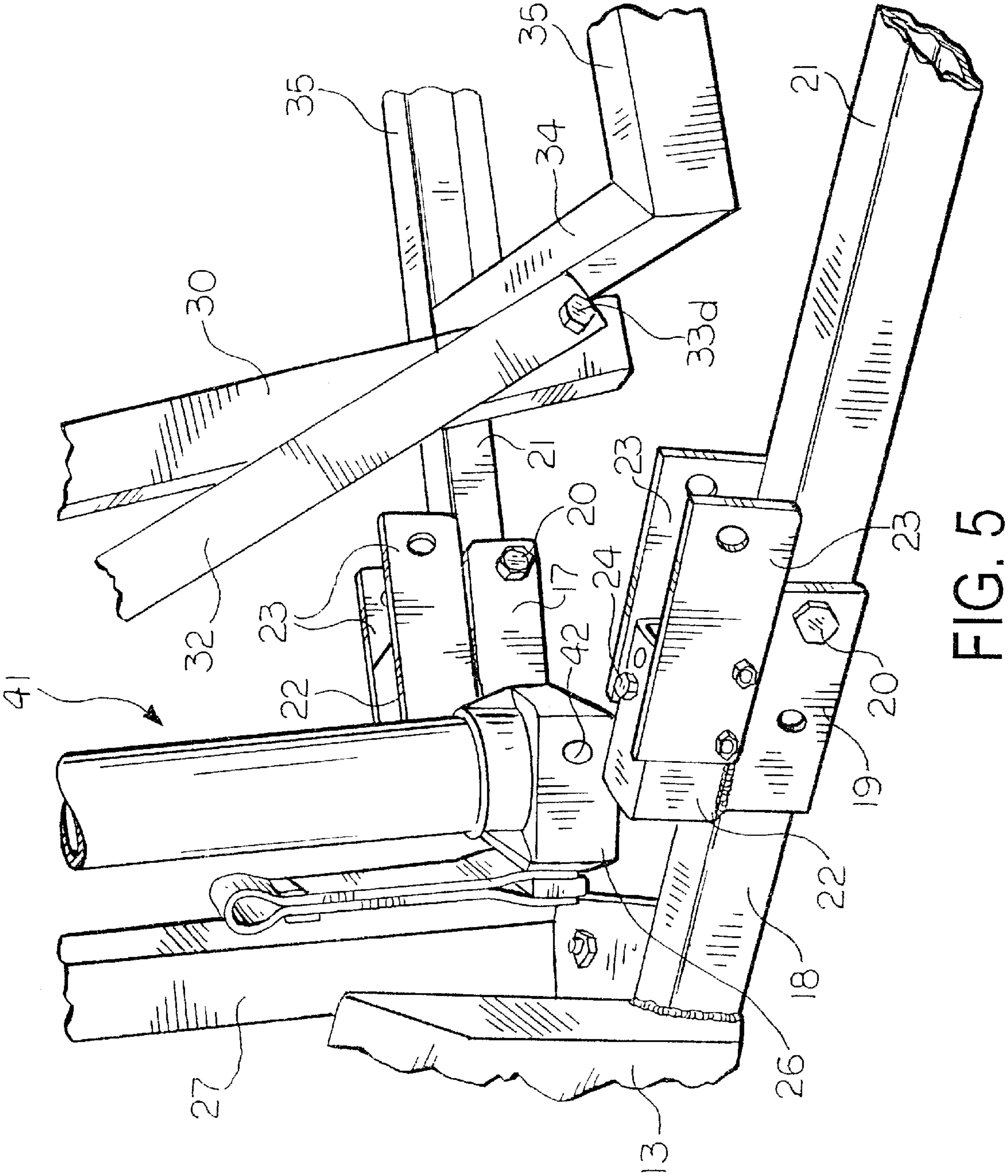
FIG. 5 is a fragmentary perspective view the lift apparatus shown in FIG. 1.

Referring to FIGS. 1 through 5, there is shown a lift apparatus 10 designed to lift motorcycles and other small vehicles for purposes such as maintenance, repositioning and storage. In FIGS. 1–3, the lift apparatus 10 is shown in a folded position that is very compact for easy storage when not in use. A base frame 11 has a central beam 12 extending in a horizontal direction. Attached to opposite ends of the central beam 12 are vertically extending intermediate beams or legs 13 each having an upper end attached to an associated horizontally outwardly extending end beam or arm 14. The beams 12, 13 and 14 can be made from square steel tubing, for example, and welded together. A free end of each of the end beams 14 is cut at an angle and closed by an attached cap or plate 15. A caster assembly 16 is attached to and extends downwardly from the bottom surface of the free end of each of the end beams 14. The caster assemblies 16 can be any suitable commercially available product that typically includes a rubber wheel that rotates about vertical (swivel motion) and horizontal (rolling motion) axes with a foot operated brake lever **16*a*** for controlling the rolling motion.

Attached to a forward facing surface of each end of the central beam 12 is an inner end of each of an inner stub leg 17 and an outer stub leg 18. The stub legs 17 and 18 extend horizontally forwardly and diverge being spaced farther apart at outer ends than at the inner ends attached to the central beam 12. The outer legs 18 are shorter than the inner legs 17 and a first bracket plate 19 is attached to an outer side wall of each of the outer legs 18 adjacent the outer end and extends even with the outer end of the inner stub leg 17. Apertures are formed in the inner legs 17 and the first bracket plates 19 to receive a pivot means or axles 20 in the form of a bolt and nut extending horizontally transverse to a longitudinal axis of the respective outer stub leg 18. Positioned between the inner stub leg 17 and the bracket plate 19 is an inner end 21*a* of a folding leg 21 having apertures formed therein receiving the axle 20 thereby permitting the legs to be rotated between a down or operative position (FIGS. 4–5) and an up or storage position (FIGS. 1–3). The legs 17, 18 and 21 can be made from square steel tubing, for example, with the legs 17 and 18 welded to the central beam and the intermediate beams 13.

A stop 22, in the form of a short length of square tubing, is attached to an upper surface of the outer end of the outer stub leg 18 and extends beyond that outer end. A pair of second bracket plates 23 are attached to opposite side walls of the stop 22 and extend outwardly beyond the outer end of the stop. When the folding leg 21 is rotated about the axle 20 to the up position (FIGS. 1–3), the stop 22 prevents rotation beyond a generally vertical position. A fastener 24 can be inserted through apertures formed in the bracket plates 23 on the opposite side of the leg 21 from the stop 22 to prevent rotation of the folding leg from the up position back to the down position. In the down position of the folding leg 21 (FIG. 5), the fastener 24 can be inserted through vertically aligned apertures formed in the stop 22 and the leg 21 to retain the folding leg in the down position. A roller assembly 25 is attached to an outer end 21b of the folding leg 21 at an angle to a longitudinal axis of the folding leg to compensate for the diverging angle of the folding legs. Thus, the roller assemblies 25 are aligned with the caster assemblies 16 during forward and rearward movement of the lift apparatus 10.

A support platform 26 is attached to and extends generally horizontally forward from the central beam 12. A lower end of a center post 27 is attached to an upper surface of the platform 26 and the post extends upwardly and rearwardly to an upper end to which a transversely extending handle 28 is attached. A pair of support members 29 are connected between the center post 29 and the end beams 14. The handle 28 can be grasped by human hands for rolling the lift apparatus 10 on the caster assemblies 16 and roller assemblies 25 when the folding legs 21 are in the down position. When the folding legs 21 are in the up position, the handle 28 can be used to tilt the lift apparatus 10 rearwardly enough to lift the folding leg ends 21*a* off of the ground and permit movement on the caster assemblies 16.

A portion of the center post 27 functions as an inner short link of a parallelogram linkage having an outer short link 30, a pair of upper long links 31 and a pair of lower long links 32. The links 30, 31 and 32 can be formed of square tubing. An inner end of each of the upper long links 31 is coupled on opposite sides of the center post 27 at a pivot means 33*a* adjacent the handle 28. An outer end of each of the upper long links 31 is coupled on opposite sides of the outer short link 30 at a pivot means 33*b* adjacent an upper end of the short link. An inner end of each of the lower long links 32 is coupled on opposite sides of the center post 27 at a pivot means 33*c* spaced below the pivot means 33*a*. An outer end of each of the lower long links 32 is coupled on opposite sides of the outer short link 30 at a pivot means 33*d* adjacent a lower end of the short link. The distance between the pivot means 33*a* and 33*b* is the same as the distance between the pivot means 33*c* and 33*d*, and the distance between the pivot means 33*a* and 33*c* is the same as the distance between the pivot means 33*b* and 33*d*. The pivot means 33*a* through 33*d* can be suitable fasteners such as bolts and nuts.

Attached to the lower end of the outer short link 30 is a transverse bar 34 extending generally parallel to the central beam 12. Attached to and extending horizontally forward from opposite ends of the bar 34 are support bars or arms 35 upon which a motorcycle or small vehicle (not shown) can be supported. The bar 34 and the arms 35 can be formed of square tubing. A strip of padding 35*a*, such as a neoprene material, can be attached to the upper surface of each of the arms 35. The support arms 35 can be provided with vehicle attachment means 36 such as a plurality of sliding brackets 36*a* each having an associated hook 36*b* for cooperation with straps (not shown) that can be routed over and/or through the vehicle to prevent tipping. When the lift apparatus 10 is not in use, the pivot means 33*d* can be removed permitting the outer short link 30 to rotate about the pivot means 33*b* approximately 180° to a storage position a shown in FIGS. 1–3.

Attached to each of the lower long links 32 adjacent to the pivot means 33*c* is a locking plate 37 having a plurality of apertures 38 formed therein. As the lower long link 32 is rotated upwardly about the pivot means 33*c*, each of the apertures 38 in turn clears a front surface of the center post 27. A pin 39 can be inserted through the corresponding ones of the apertures 38 in the plates 37 to engage the central post 27 and prevent downward rotation of the link 32 with a resultant lowering of the support arms 35. Thus, the apertures 38 define fixed positions of the support arms 35 above the surface on which the lift apparatus 10 is resting. The pin 39 can be retained by a chain 40 attached to any suitable portion of the lift apparatus 10 such as the center post 27.

An actuator 41, such as a hydraulic piston and cylinder, can be used to raise and lower the support arms 35. A bottom end of a cylinder 41*a* is attached to the support platform 26 by a pivot means 42 for movement about an axis parallel to the rotation axes of the pivot means 33*a* through 33*d*. The actuator 41 extends between the lower long links 32 and has a piston rod 41*b* extending from the cylinder 41*a* with an upper end connected to the upper long links 31 at a pivot means 33*e*. Thus, extending the rod 41*b* from the cylinder 41*a* raises the support arms 35 and retracting the rod into the cylinder lowers the support arms. The actuator 41 can be manually operated through a pumping handle 43 extending therefrom whereby repeated raising and lowering of the handle forces hydraulic fluid into a cylinder chamber (not shown) against a piston (not shown) to extend the piston rod 41*b*. A release lever 44 is provided to vent the hydraulic fluid from the cylinder chamber thereby allowing the piston rod 41*b* to retract into the cylinder 41*a* under the weight of the supported portions of the lift apparatus 10.

Figure 6:
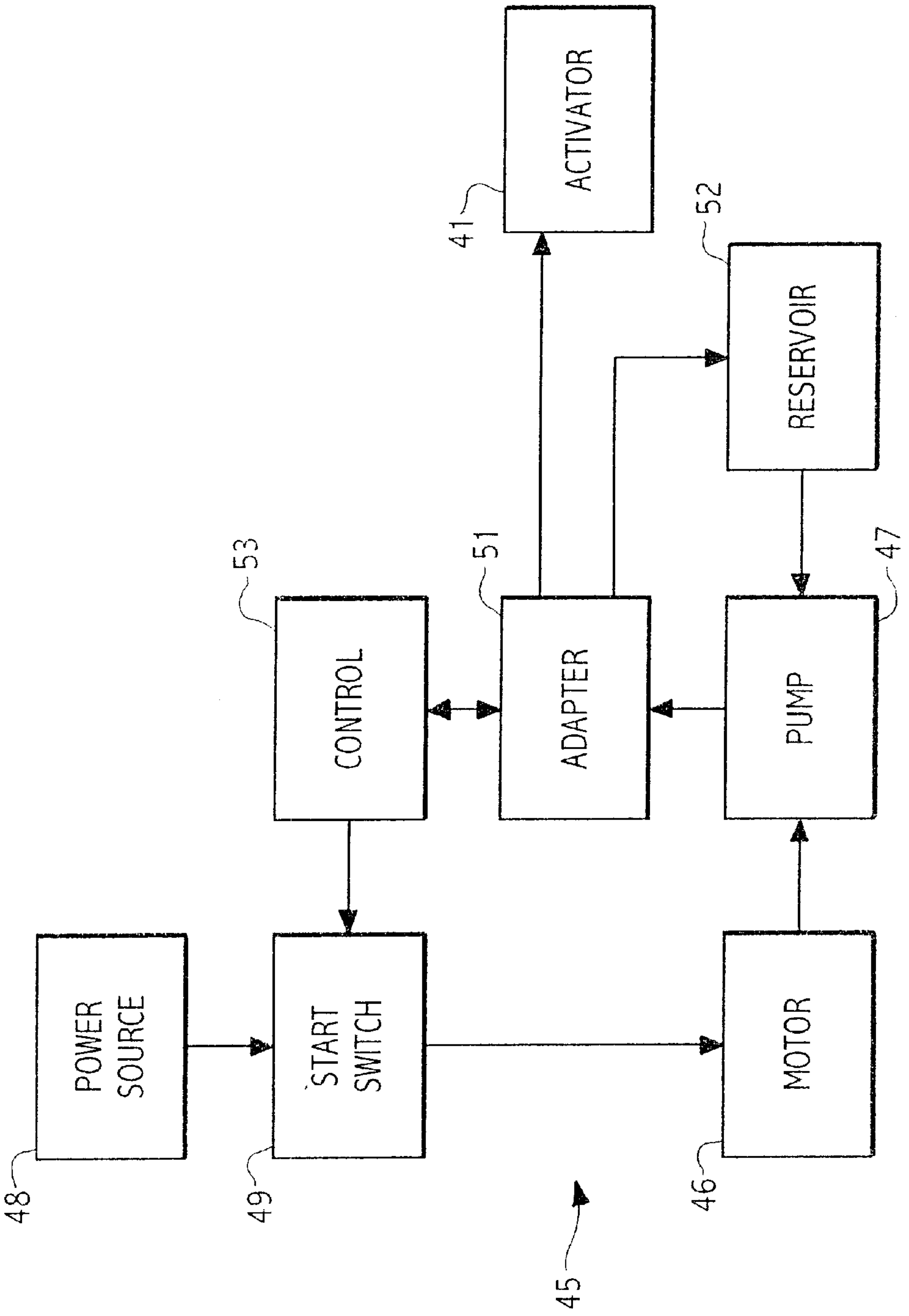
FIG. 6 is a block diagram of the power unit of the lift apparatus shown in FIG. 1.

The actuator 41 also can be automatically operated utilizing a power unit 45 (shown schematically in FIG. 6) including an electric motor 46 driving a hydraulic pump 47. The electric motor 46 can be an ac motor or a dc motor and is connected to a power source 48 through a start switch 49. In the case of an ac motor, the power source typically would be a building electrical circuit accessed at a wall outlet. In the case of a dc motor, the power source 48 could be a storage battery 50 mounted at the rear of the central beam 12. The power source 48 could include a converter (not shown) for changing ac power to dc power to operate the dc motor and/or charge the storage battery 50. The motor 46 and the pump 47 are mounted on an adapter 51 with the pump being enclosed in a reservoir 52 mounted on an opposite side of the adapter from the pump. The adapter 51 can be attached to one of the intermediate beams 13 and extend behind the base frame 11.

A control 53 is connected to the adapter 51 and to the start switch 49 for starting and stopping the motor 46. To start the motor 46, the control 53 is actuated to cause the start switch 49 to connect the motor to the power source 48. The motor 46 drives the pump 47 to draw hydraulic fluid from the reservoir 52 and send pressured hydraulic fluid to the adapter 51. The adapter 51 is connected to the actuator 41 to supply the pressured hydraulic fluid causing the actuator to raise the support arms 35. The control 53 can be actuated to stop the motor 46 and retain the actuator 41 in a desired extended position. To lower the support arms 35, the control 53 is actuated to release hydraulic fluid from the actuator 41 to flow through the adapter and back to the reservoir 52.

The manually actuated version of the actuator 41 can be, for example, a commercially available long ram jack such as an eight-ton capacity hydraulic long hand jack with clevis item #14554 available from Northern Tool division of Northern Tool & Equipment Co. at "northerntool.com". An alternative is the eight-ton capacity long ram jack with flat base item #14446 available from Northern Tool. The automatically actuated version of the actuator 41 can be a welded tee hydraulic cylinder item #908320 available from Northern Tool. The associated power unit 45 can include a Haldex Barnes Hydraulics 12 volt DC power unit item #1071 or a Haldex Bames Hydraulics 1 HP 115/208–230 Volt AC Hydraulic Power Unit item #105881, both available from Northern Tool.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A lift apparatus for supporting motorcycles and small vehicles comprising:

a ground engaging base frame having an upwardly extending center post;

a parallelogram linkage having an upper link means, a lower link means extending generally parallel to said upper link means, an outer link means, and an inner link means formed by a portion of said center post, said upper link means being connected by first and second pivot means to said inner and outer link means respectively, said lower link means being connected by third and fourth pivot means to said inner and outer link means respectively;

a pair of folding legs each having an inner end pivotally connected to said base frame and an outer end, said legs being rotatable between a generally horizontal lowered position wherein said outer ends engage the ground and a generally vertical raised position wherein said inner ends engage the ground;

a vehicle support means attached to said outer link means of said parallelogram linkage, and an actuator means having a lower end pivotally connected to said base frame and an upper end connected to one of said upper link means and said lower link means by a fifth pivot means whereby extension of said actuator means raises said vehicle support means between a lowered position for engaging and disengaging from a vehicle and a fully raised position a predetermined distance above the ground on which said base frame rests, said fourth pivot means being selectively operative to detach said outer link means from said lower link means and permit rotation of said vehicle support means to a storage position.

2. The lift apparatus according to claim 1 wherein said base frame includes a pair of ground engaging casters.

3. The lift apparatus according to claim 1 wherein each said folding leg outer end is provided with a roller, wherein when said legs are in said lowered position said rollers engage the ground.

4. The lift apparatus according to claim 3 including fastener means for selectively retaining said legs in said lowered position and in said raised position.

5. The lift apparatus according to claim 1 wherein said upper link means includes a pair of upper long links positioned on opposite sides of said inner and outer link means and said lower link means includes a pair of lower long links positioned on opposite sides of said inner and outer link means.

6. The lift apparatus according to claim 1 wherein said vehicle support means includes a pair of spaced apart support arms.

7. The lift apparatus according to claim 6 including padding attached to a load supporting surface of said support arms.

8. The lift apparatus according to claim 6 including vehicle attachment means connected to said support arms for holding a vehicle on said support arms.

9. The lift apparatus according to claim 8 wherein said vehicle attachment means includes a plurality of brackets slidingly mounted on said support arms, each said bracket having a vehicle engaging hook connected thereto.

10. The lift apparatus according to claim 1 including locking plate means attached to said lower link means and cooperating with said center post to retain said vehicle support means in at least one intermediate position between said lowered position and said fully raised position.

11. The lift apparatus according to claim 1 including a handle attached to an upper end of said center post.

12. The lift apparatus according to claim 1 including a power unit connected to said actuator means for selectively activating said actuator means to raise and lower said vehicle support means.

13. The lift apparatus according to claim 12 wherein said actuator means is a hydraulic cylinder and said power unit includes an electric motor driving a hydraulic pump providing pressured hydraulic fluid to said cylinder.

14. A lift apparatus for supporting motorcycles and small vehicles comprising:

a base frame having a pair of ground engaging caster means and an upwardly extending center post;

a pair of folding legs each having an inner end pivotally connected to said base frame and an outer end with a ground engaging roller;

a parallelogram linkage having a pair of upper long links, a pair of lower long links extending generally parallel to said upper long links, an outer short link, and an inner short link formed by a portion of said center post, said upper long links being connected by first and second pivot means to said inner and outer short links respectively, said lower long links being connected by third and fourth pivot means to said inner and outer short links respectively;

a vehicle support means attached to said outer short link of said parallelogram linkage; and an actuator means having a lower end pivotally connected to said base frame and an upper end connected to said upper long links by a fifth pivot means whereby extension of said actuator means raises said vehicle support means between a lowered position for engaging and disengaging from a vehicle and a fully raised position a predetermined distance above the ground on which said base frame rests, said fourth pivot means being selectively operative to detach said outer short link from said lower long links and permit rotation of said vehicle support means to a storage position.

15. The lift apparatus according to claim 14 including a power unit connected to said actuator means for selectively activating said actuator means to raise and lower said vehicle support means.

16. The lift apparatus according to claim 15 wherein said actuator means is a hydraulic cylinder and said power unit includes an electric motor driving a hydraulic pump providing pressured hydraulic fluid to said cylinder.

17. A lift apparatus for raising and lowering a small vehicle comprising: a base frame having a pair of ground engaging casters and an upwardly extending center post;

a pair of folding legs each having an inner end pivotally connected to said base frame and an outer end with a roller attached thereto, said casters and said rollers permitting the lift apparatus to roll across the ground surface;

a parallelogram linkage having: a pair of upper long links, a pair of lower long links extending generally parallel to said upper long links, an outer short link, and an inner short link formed by a portion of said center post, said upper long links being connected by first and second pivot means to said inner and outer short links respectively, said lower long links being connected by third and fourth pivot means to said inner and outer short links respectively;

a vehicle support means attached to said outer short link of said parallelogram linkage;

an actuator means having a lower end pivotally connected to said base frame and an upper end connected to said upper long links by a fifth pivot means whereby extension of said actuator means raises said vehicle support means between a lowered position for engaging and disengaging from a vehicle and a fully raised position a predetermined distance above the ground on which said base frame rests, said fourth pivot means being selectively operative to detach said outer short link from said lower long links and permit rotation of said vehicle support means to a storage position; and at least one of a pumping handle and a power unit connected to said actuator means for selectively activating said actuator means to raise said vehicle support means.

18. The lift apparatus according to claim 17 wherein said actuator means is a hydraulic cylinder and said power unit includes an electric motor driving a hydraulic pump providing pressured hydraulic fluid to said cylinder.

19. The lift apparatus according to claim 17 including fastener means for selectively retaining said legs in said lowered position and in said raised position.

20. The lift apparatus according to claim 17 wherein said vehicle support means includes a pair of spaced apart support arms and vehicle attachment means connected to said support arms for holding a vehicle on said support arms, said vehicle attachment means including at least one bracket slidingly mounted on each of said support arms, each said at least one bracket having a vehicle engaging hook connected thereto.

* * * * *